Oct. 24, 1972   R. ZITO, JR   3,700,514

MAKING LAYERED STRUCTURES

Filed Feb. 2, 1971

United States Patent Office 3,700,514
Patented Oct. 24, 1972

3,700,514
MAKING LAYERED STRUCTURES
Ralph Zito, Jr., Westford, Mass., assignor to The Zito Company, Inc., Derry, N.H.
Filed Feb. 2, 1971, Ser. No. 111,939
Int. Cl. B32b 31/12
U.S. Cl. 156—280    7 Claims

ABSTRACT OF THE DISCLOSURE

Forming a two-layer laminate from layers formed of different thermoplastic materials, of which the first thermoplastic material has a substantially higher softening temperature than the second, by spreading into the surface of the first thermoplastic material particles of a porous filler of irregular configuration, slightly softening this surface and applying pressure to imbed the particles only partially but firmly into the first thermoplastic material, cooling this first layer, placing the material of the second layer on this surface, and subjecting the two layers to a temperature below the softening range of the first thermoplastic material but within the softening range of the second to adhere the second thermoplastic material to the exposed surfaces of the filler particles.

---

This invention relates to bonding unlike plastics.

In certain environments, composite or laminated structures are desired, the lamina of which are formed of plastic materials of widely different properties. One such composite structure is an electrode used in metal-halogen electrochemical energy systems, such as in zinc bromide rechargable storage batteries, described in the assignee's copending U.S. patent application, entitled Halogen System, Ser. No. 112,254, filed Feb. 3, 1971, in the name of Ralph Zito, Jr.

One lamina of such a composite, to have halogen-inertness and halogen-impermeability, requires a polyfluorocarbon bonding agent, while the adjacent lamina, which need be only inert to halogen, is advantageously formed with a more workable, and less expensive polyethylene bonding agent. However, polyethylene (as well as similar thermoplastics) is difficult to adhere to the polyfluorocarbons, particularly because the softening temperatures of the polyfluorocarbons are very close to or even well above the maximum temperatures to which polyethylene and the like can be subjected without degradation or other destruction.

An object of this invention is to provide an improved process for making laminates from lamina formed of unlike plastics—e.g., those which have substantially different processing temperatures, without degrading or otherwise destroying either plastic.

Another object is to bond a polyfluorocarbon lamina to a polyalkylene lamina.

A particular object is to provide improved methods for making strong, durable, and reliable plastic-bonded electrode structures useful in electrochemical energy systems such as rechargable metal halide (specifically zinc bromide) storage batteries.

The invention features a process for forming a two-layer laminate by adhering to a first layer, formed of a first thermoplastic material having a first temperature range within which the first thermoplastic material softens, a second layer formed of a second thermoplastic material having a second temperature range within which the second thermoplastic material softens, this second temperature range being substantially lower than the first temperature range, comprising the steps of spreading onto a surface of the first layer particles of a porous filler of irregular surface configuration, which remain rigid at the first temperature range, subjecting at least the surface of the layer containing the filler to heat at a first processing temperature near the lower end of the first temperature range to soften the first thermoplastic material at the surface of the first layer without causing the material to flow substantially throughout the depth of the layer and applying pressure at this temperature to imbed the particles only partially but firmly into the slightly softened thermoplastic material, so that the particles protrude only partway into the material and remain partially exposed on the surface, cooling the first layer while still under pressure to a temperature below the first temperature range, removing excess particles from the surface of the first layer, placing the material of the second layer on the surface of the first layer which now contains the filler particles, subjecting the layers to a second processing temperature within the second temperature range but below the first temperature range to adhere the second thermoplastic material to the exposed surfaces of the filler particles, and cooling the layers to a temperature below the scond temperature range.

Where the first thermoplastic material is a polyfluorocarbon, a first processing temperature not greater than about 50° F. above the softening point of the polyfluorocarbon is preferred.

In a preferred embodiment, activated carbon particles (as a porous filler) are imbedded into a first layer which consists essentially of 25% to 75% by weight of an inert filler and the remainder by weight of poly (vinylidene fluoride) at a first processing temperature between about 375° F. and 400° F. under a pressure of about 350 to 400 p.s.i., and a second thermoplastic layer is formed by spreading onto the surface of the first layer containing the imbedded activated carbon particles a mixture comprising activated carbon particles and polyethylene, and subjecting the resultant structure to a second processing temperature of about 300° F. to 350° F. Preferably, the second processing temperature is accompanied by a pressure of 25 to 125 p.s.i., and the two-layer laminate is cooled, under such an applied pressure, to below 300° F.

Other objects, features and advantages will appear to one skilled in the art from the following description of a preferred embodiment of the invention taken together with the attached drawings thereof, in which.

Figure 1:
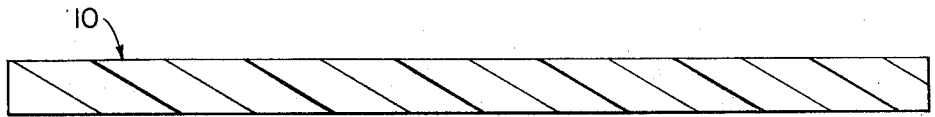
FIG. 1 is a cross-sectional view of a first thermoplastic layer to which a second thermoplastic layer is to be bonded.

FIG. 1 shows a first layer 10, which consists essentially of 25% to 75% by weight of graphite, and the remainder by weight of poly (vinylidene fluoride) (Pennwalt "Kynar 301"), such as described in the assignee's above-referenced patent application for Halogen System. This layer has a softening temperature of about 340–350° F., and, in general, a working temperature range of about 340–600° F. This layer is both inert and impermeable to bromine, and electroconductive, and hence is useful as a backing layer for forming electrodes in metal bromide batteries and other energy systems.

Figure 2:
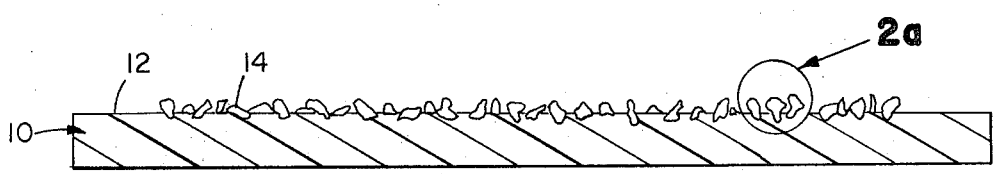
FIG. 2 is a cross-sectional view of the first thermoplastic layer with particles of a porous filler imbedded therein.
Figure 2A:
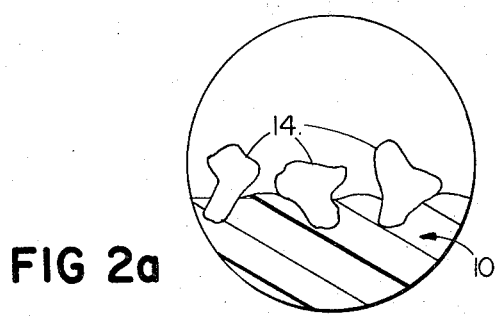
FIG. 2a is an enlarged view of the encircled portion of the layer of FIG. 2.

Referring to FIGS. 2 and 2a, there is spread onto the exposed surface 12 of the first layer 10 a shallow but surface covering depth of activated carbon particles 14 (Barneby Cheney UU Grade). As shown, about 2 grams are spread in a uniform thickness over a 9 in. x 9 in. area.

A suitably dimensioned frame may be used to confine the particles within this area. The layer 10, with the loose covering of activated carbon particles, is placed between two platens, heated to 375° F. for one minute without pressure, compressed between the platens at 375° F. and 400 p.s.i. for two minutes, transferred to platens at room temperature and cooled for two minutes between these platens at 400 p.s.i. The surface 12 is then scrubbed with a conventional stiff scrubbing brush to remove nonbonded activated carbon particles. The 375° temperature having been sufficient to soften slightly the poly(vinylidene fluoride) binder of the first layer 10 without affecting the basic shape and form of the layer, the activated carbon particles are now bonded to the surface of the layer 10 by the poly(vinylidene fluoride) bonding agent, forming the structure shown in FIGS. 2 and 2a. The particles do not strike through the layer 10, and have substantial regions exposed above the surface 12.

Onto the activated carbon surface so formed is trowelled, with the confines of a frame enclosing a 9 in. x 9 in. area, a mixture consisting of an inert filler and polyethylene. For example, in making a cathode for a metal bromide battery, the mixture might be 90% by weight of the aforesaid activated carbon and about 10% by weight of polyethylene particles ("FM-510" powder, available from U.S. Indus. Chem. Co.), the total amount being selected to provide a desired thickness for the second layer. This mixture is ball milled for fourteen minutes before trowelling. There may also be trowelled, in the same manner, mixtures of polyethylene and other inert fillers, such as a mixture of about 90% by weight of diatomaceous earth and 10% by weight of polyethylene used as a surface layer in certain metal bromide battery electrodes. On the second layer may be formed in sublayers of such mixtures.

The structure containing the carbon-particle imbedded first layer and the mixture for the second layer is then placed between platens, heated to 300° F. for 7 minutes, pressed at 75 p.s.i. and 300° F. for 7 minutes, transferred to platens at room temperature, and cooled at 75 p.s.i. for 7 minutes.

Figure 3:
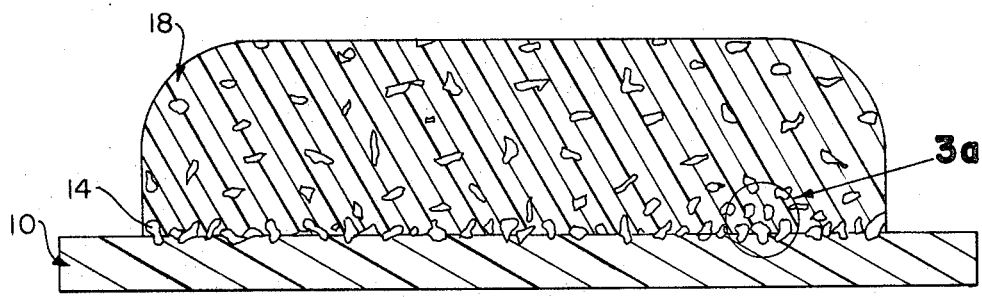
FIG. 3 is a cross-sectional view of the finished two-layer composite.
Figure 3A:
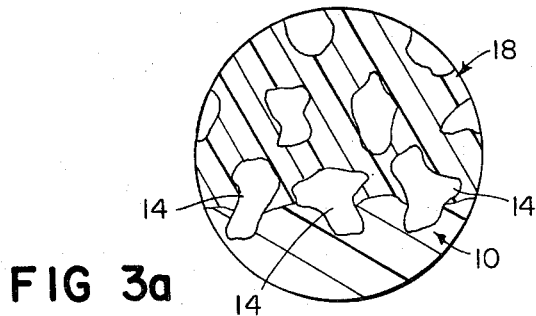
FIG. 3a is an enlarged view of the encircled portion of the composite of FIG. 3.

The resultant laminate is shown in FIGS. 3 and 3a. The thermoplastic polyethylene of the second layer 18 is bonded in and to the exposed surfaces of the particles 14, thus bonding the two layers 10, 18 together through the particle 14.

The addition of the activated carbon particles onto the surface 12 thus enables the polyfluorocarbon-base layer 10 to be adhered to the polyethylene-base layer 18, forming a composite structure, without the necessity of subjecting the polyethylene to temperatures at which it would possibly degrade. Moreover, the activated carbon particles in the layer 18, required to be adsorbent, will retain their adsorbency since the polyethylene need not even be heated to temperatures at which it would flow into the pores. Neither will the polyethylene flow in such a manner as to become mal-distributed in the mixture, thus assuring strong bonding between the filler particles of layer 18, as well as between the two layers 10 and 18.

Other embodiments will occur to those skilled in the art and are within the following claims.

What is claimed is:

1. A process for forming a two-layer laminate by adhering to a first layer, formed of a first thermoplastic material having a first temperature range within which said first thermoplastic material softens, a second layer formed of a second thermoplastic material having a second temperature range within which said second thermoplastic material softens, said second temperature range being substantially lower than said first temperature range, comprising the steps of:

spreading onto a surface of said first layer particles of a porous filler of irregular surface configuration, which remain rigid at said first temperature range, subjecting at least the surface of said layer containing said filler to heat at a first processing temperature near the lower end of said first temperature range to soften said first thermoplastic material at said surface without causing said material to flow substantially throughout the depth of said layer and applying pressure at said temperature to imbed said particles only partially but firmly into the slightly softened first thermoplastic material, so that said particles protrude only part way into said material and remain partially exposed on said surface, cooling said first layer while still under said pressure to a temperature below said first temperature range, removing excess particles from the surface of said layer, placing the material of said second layer on the surface of said first layer containing said filler particles, subjecting said layers to a second processing temperature within said second temperature range but below said first temperature range to adhere the said second thermoplastic material to the exposed surfaces of said filler particles, and cooling said layers to a temperature below said second temperature range.

2. The process of claim 1 wherein said porous filler comprises activated carbon.

3. The process of claim 1 wherein said first thermoplastic material is a polyfluorocarbon and said first processing temperature is not greater than about 50° F. above the softening point of said polyfluorocarbon layer.

4. The process of claim 3 wherein said first layer consists essentially of 25 to 75% by weight of inert filler and the remainder by weight of poly(vinylidene fluoride), and said first processing temperature is between about 375° F. and about 400° F.

5. The process of claim 4 wherein said applied pressure is about 350 to 400 p.s.i.

6. The process of claim 1 wherein said second thermoplastic material is polyethylene and said second processing temperature is between about 300° F. and about 350° F.

7. The process of claim 1 wherein said first layer consists essentially of about 25% to 75% by weight of inert filler and the remainder by weight of poly(vinylidene fluoride), said porous filler is activated carbon, and said second layer is to include activated carbon and polyethylene, comprising the steps of:

spreading on the surface of said first layer containing said imbedded activated carbon particles a mixture comprising activated carbon particles and polyethylene, subjecting the structure so formed to a processing temperature between about 300° F. and 350° F. and a pressure of about 25 to 125 p.s.i., and cooling the resultant structure while maintaining a pressure of about 25 to 125 p.s.i. to a temperature below about 300° F.

References Cited

UNITED STATES PATENTS

| | | | |
|---|---|---|---|
| 2,888,975 | 6/1959 | Benedict | 156—279 |
| 3,084,088 | 4/1963 | Hunkeler | 156—285 X |
| 3,488,714 | 1/1970 | Walters et al. | 161—162 X |
| 3,496,057 | 2/1970 | McCluer | 156—276 X |
| 3,511,738 | 4/1970 | McGuire | 156—276 X |

FOREIGN PATENTS

| | | | |
|---|---|---|---|
| 1,077,099 | 3/1960 | Germany | 156—275 |

CARL D. QUARFORTH, Primary Examiner

P. A. NELSON, Assistant Examiner

U.S. Cl. X.R.

156—267, 298, 303.1, 306; 161—87